(12) United States Patent
Xu

(10) Patent No.: US 12,121,182 B2
(45) Date of Patent: Oct. 22, 2024

(54) LIFTING MECHANISM AND STEAK GRILL

(71) Applicant: Liang Xu, Shenzhen (CN)

(72) Inventor: Liang Xu, Shenzhen (CN)

( * ) Notice: Subject to any disclaimer, the term of this patent is extended or adjusted under 35 U.S.C. 154(b) by 589 days.

(21) Appl. No.: 17/519,796

(22) Filed: Nov. 5, 2021

(65) Prior Publication Data
US 2023/0144466 A1    May 11, 2023

(51) Int. Cl.
*A47J 37/07* (2006.01)
*A47J 37/04* (2006.01)
*A47J 37/06* (2006.01)

(52) U.S. Cl.
CPC .......... *A47J 37/0745* (2013.01); *A47J 37/04* (2013.01); *A47J 37/0623* (2013.01); *A47J 37/0786* (2013.01); *A47J 2037/0795* (2013.01)

(58) Field of Classification Search
CPC ...... A47J 37/04; A47J 37/067; A47J 37/0745; A47J 37/0795
USPC ............... 99/393, 421 HV; 126/25 A, 25 AA
See application file for complete search history.

(56) References Cited

U.S. PATENT DOCUMENTS

| | | | | |
|---|---|---|---|---|
| 4,541,406 A | * | 9/1985 | DaSambiagio | ......... F24B 1/205 99/446 |
| 5,363,752 A | * | 11/1994 | Weil | ...................... A47J 37/067 99/425 |
| 9,003,961 B2 | * | 4/2015 | Snow | .................... A47J 37/041 126/25 AA |
| 9,902,599 B1 | * | 2/2018 | Veresko | .................... B66F 7/10 |
| 2011/0283989 A1 | * | 11/2011 | Ikeda | .................. A47J 37/0704 126/25 A |

* cited by examiner

*Primary Examiner* — Reginald Alexander
(74) *Attorney, Agent, or Firm* — Leason Ellis LLP

(57) ABSTRACT

A lifting mechanism is disclosed including: a base, on both sides of which a first vertical guide rail and a second vertical guide rail are provided respectively; a driving mechanism, including a first sliding block slidably mounted on the first guide rail, a motor assembly fixedly mounted on the first sliding block, a first rack arranged on the first guide rail, a first gear engaged with the first rack, a second sliding block slidably mounted on the second guide rail, a second rack arranged on the second guide rail, a second gear engaged with the second rack and a linkage shaft connected with the first and second gears and driven to rotate by the motor assembly; and a connecting mechanism connected with an external component and drivable by the driving mechanism to move up and down.

10 Claims, 4 Drawing Sheets

LIFTING MECHANISM AND STEAK GRILL

TECHNICAL FIELD

The disclosure relates to the technical field of household appliances, in particular to a lifting mechanism and a steak grill.

BACKGROUND

For ordinary families, there are more and more new-style household appliances and kitchenware in people's lives now, such as steak grills, toasters, new-style hot pot machines and new-style fryers. These kitchenware have greatly improved people's life quality and made it more convenient for people to process food. Most of existing electrical appliances are equipped with lifting mechanisms, such as steak grills, and the lifting mechanisms control and adjust the distance between grill pans, so that the purpose of customized grilling of steaks is achieved. However, the existing lifting mechanisms have the problem of non-synchronization during lifting, which leads to jams during the lifting process.

SUMMARY

The disclosure aims to solve at least one of the technical problems in the existing technology. Therefore, the disclosure provides a lifting mechanism which can ensure the synchronization of the lifting mechanism during lifting so as to ensure smooth lifting.

A lifting mechanism according to an embodiment of the first aspect of the disclosure includes a base, where a first vertical guide rail and a second vertical guide rail are provided on both sides of the base respectively; a driving mechanism including an active driving mechanism, a passive driving mechanism and a linkage assembly, where the active driving mechanism includes a motor assembly, a first sliding block, a first gear and a first rack, where the first sliding block is slidably mounted on the first guide rail, the motor assembly is fixedly mounted on the first sliding block, the first rack is provided on the first guide rail along a length direction of the first guide rail, and the first gear is engaged with the first rack; the passive driving mechanism includes a second sliding block, a second gear and a second rack, where the second sliding block is slidably mounted on the second guide rail, the second rack is provided on the second guide rail along a length direction of the second guide rail, and the second gear is engaged with the second rack; the linkage assembly includes a linkage shaft, the linkage shaft is connected with the first gear and the second gear, the linkage shaft is driven to rotate by the motor assembly, the first gear and the first sliding block are provided to rotate relative to each other, and the second gear and the second sliding block are provided to rotate relative to each other; and a connecting mechanism configured for being connected with an external component and capable of being driven by the driving mechanism to move up and down.

The lifting mechanism according to an embodiment of the disclosure has at least the following technical effects:

By using the motor assembly to drive the linkage shaft, the first gear and the second gear on the linkage shaft rotate synchronously, so that the first gear and the second gear move up and down on the first rack and the second rack correspondingly, and then the first sliding block on the first guide rail and the second sliding block on the second guide rail move up and down, where the motor assembly also moves up and down with the first sliding block, therefore the connecting mechanism moves up and down with the driving mechanism, which can ensure the synchronization of the lifting mechanism during lifting, thereby ensuring smooth lifting.

According to some embodiments of the disclosure, the connecting mechanism is rotatably connected with the linkage shaft. Thus, the linkage shaft can drive the connecting mechanism in such as way that the external component can move up and down without rotating with the linkage shaft.

According to some embodiments of the disclosure, the connecting mechanism is a bearing, an inner ring of the bearing is in interference fit with the linkage shaft, and an outer ring of the bearing is in interference fit with the external component. The bearing is rotatably connected with the linkage shaft and the external component respectively, which can ensure that when the linkage shaft rotates slowly, the external component can move up and down with the bearing without rotating.

According to some embodiments of the disclosure, at least two bearings are mounted on the linkage shaft. The reliability can be ensured during connection with external components.

According to some embodiments of the disclosure, the connecting mechanism is fixedly connected to the first sliding block and/or the second sliding block. Thus, the connecting mechanism can move up and down with the corresponding sliding block.

Another objective of the disclosure is to provide a steak grill.

The steak grill according to an embodiment of the second aspect of the disclosure includes: a cabinet body in which a grill chamber is formed, where an upper grill pan and a lower grill pan are provided in the grill chamber; and the lifting mechanism as described above; where the connecting mechanism is connected with the upper grill pan or the lower grill pan, and rotation of the motor assembly enables relative movement between the upper grill pan and the lower grill pan.

The steak mechanism according to the embodiments of the disclosure has at least the following technical effects: the motor assembly rotates to drive the upper grill pan and the lower grill pan to move relative to each other, then the distance between the upper grill pan and the lower grill pan can be adjusted according to steaks of different thicknesses for customized grilling, and meanwhile, the smoothness of the relative movement of the upper grill pan and the lower grill pan can be ensured.

According to some embodiments of the disclosure, chamber walls of the grill chamber are provided with guide grooves in the vertical direction, a mounting cavity is formed between an outer shell of the cabinet body and the chamber walls of the grill chamber, the active driving mechanism and the passive driving mechanism are both provided in the mounting cavity, and the linkage shaft penetrates through the guide grooves and is rotatably mounted on the upper grill pan.

According to some embodiments of the disclosure, the upper grill pan is provided with through holes, the linkage shaft is provided with two bearings, the linkage shaft penetrates through the through holes, and the bearings are mounted cooperatively with the through holes. Thus the upper grill pan and the bearings are rotatably mounted, when the linkage shaft rotates at a low speed, the upper grill pan does not rotate when moving up and down with the linkage shaft.

According to some embodiments of the disclosure, a heating device is provided in the upper grill pan. Food on the lower grill pan is heated by the heating device in the upper grill pan.

According to some embodiments of the disclosure, a cabinet door is provided on the cabinet body in a hinged mode.

BRIEF DESCRIPTION OF DRAWINGS

The above and/or additional aspects and advantages of the disclosure will become obvious and easy to understand from the description of the embodiments in conjunction with the following accompanying drawings, in which.

REFERENCE NUMERALS

Figure 1:
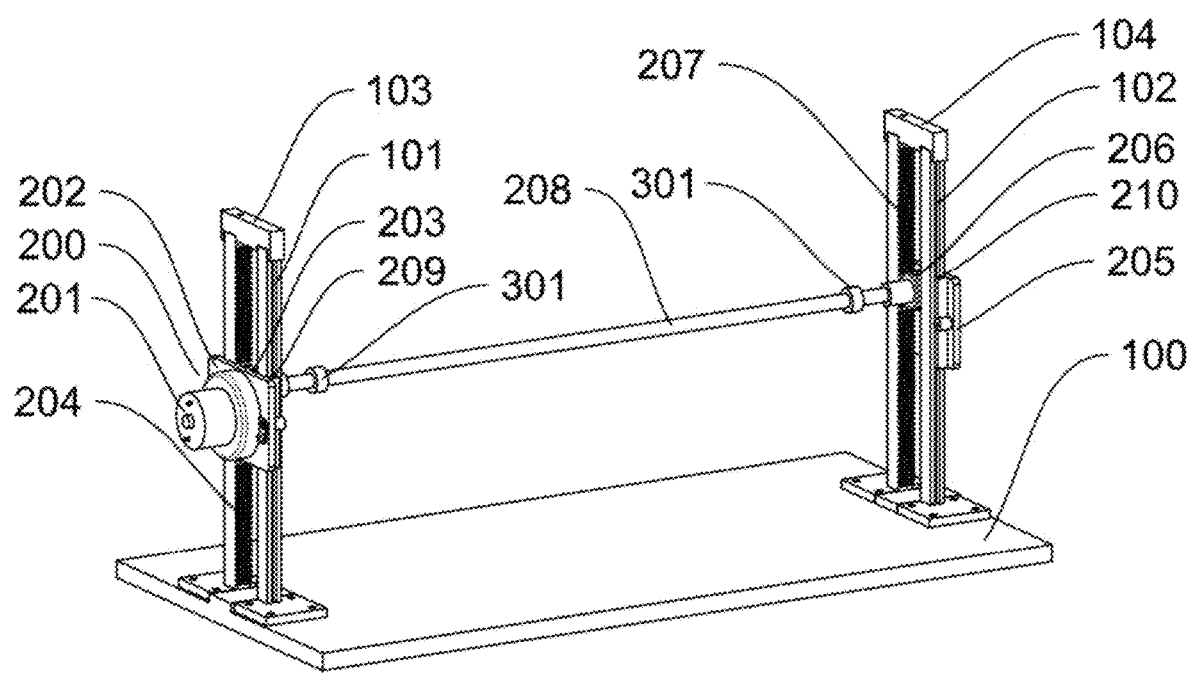
FIG. 1 is a schematic diagram of a lifting mechanism according to an embodiment of the disclosure.

100. Base; 101. First sliding chute; 102. Second sliding chute; 103. First guide rail; 104. Second guide rail; 105. Reinforcing shaft; 200. Driving mechanism; 201. Motor assembly; 202. First sliding block; 203. First gear;

204. First rack; 205. Second sliding block; 206. Second gear; 207. Second rack; 208. Linkage shaft; 209. First limiting block; 210. Second limiting block;

301. Bearing;

400. Cabinet; 401. Grill chamber; 402. Upper grill pan; 403. Lower grill pan; 404. Guide groove; 405. Through hole; 406. Cabinet door; 407. Thermal insulation glass; and 408. Knob.

DETAILED DESCRIPTION

The embodiments of the disclosure are described in detail below. Examples of the embodiments are shown in the accompanying drawings, in which the same or similar reference numerals indicate the same or similar elements or elements with the same or similar functions. The embodiments described below with reference to the accompanying drawings are exemplary, are only used to explain the disclosure, and cannot be understood as a limitation of the disclosure.

In the description of the present disclosure, it should be understood that, descriptions relating to orientation, for example, orientation or positional relationships indicated by "up", "down", "front", "back", "left", "right", etc. are based on the orientation or positional relationships shown in the accompanying drawings, and are to facilitate the description of the present disclosure and simplify the description only, rather than indicating or implying that the device or element referred to must have a specific orientation or be constructed and operated in a specific orientation, and therefore cannot be construed as limiting the present disclosure.

In the description of the present disclosure, the meaning of "several" is one or more, the meaning of "a plurality of" is two or more, "greater than", "less than", "more than", etc. are to be understood to exclude the given figure, and "above", "below", "within", etc. are understood to include the given figure. If "first" and "second", etc. are referred to, it is only for the purpose of distinguishing technical features, and shall not be understood as indicating or implying relative importance or implying the number of the indicated technical features or implying the sequence of the indicated technical features.

In the description of the present disclosure, unless otherwise explicitly defined, the words such as "set", "install", and "connect" should be understood in a broad sense, and those skilled in the art can determine the specific meanings of the above words in the present disclosure in a rational way in combination with the specific contents of the technical solutions.

A lifting mechanism according to an embodiment of the disclosure is described below with reference to FIG. 1.

As shown in FIG. 1, a lifting mechanism according to an embodiment of the disclosure includes a base 100, where a first vertical guide rail 103 and a second vertical guide rail 104 are provided on both sides of the base 100 respectively; a driving mechanism 200 including an active driving mechanism, a passive driving mechanism and a linkage assembly, where the active driving mechanism includes a motor assembly 201, a first sliding block 202, a first gear 203 and a first rack 204, the first sliding block 202 is slidably mounted on the first guide rail 103, the motor assembly 201 is fixedly mounted on the first sliding block 202, the first rack 204 is provided on the first guide rail 103 along a length direction of the first guide rail 103, the first gear 203 is engaged with the first rack 204, the passive driving mechanism includes a second sliding block 205, a second gear 206 and a second rack 207, the second sliding block 205 is slidably mounted on the second guide rail 104, the second rack 207 is provided on the second guide rail 104 along a length direction of the second guide rail 104, the second gear 206 is engaged with the second rack 207, the linkage assembly includes a linkage shaft 208, the linkage shaft 208 is connected with the first gear 203 and the second gear 206, the linkage shaft 208 is driven to rotate by the motor assembly 201, the first gear 203 and the first sliding block 202 are provided to rotate relative to each other, and the second gear 206 and the second sliding block 205 are provided to rotate relative to each other; and a connecting mechanism configured for being connected with an external component and capable of being driven by the driving mechanism 200 to move up and down.

For example, in some embodiments of the disclosure, as shown in FIG. 1, the first vertical guide rail 103 and the second vertical guide rail 104 are fixedly mounted on both sides of the base 100 symmetrically, each of the middle of the first guide rail 103 and the middle of the second guide rail 104 is provided with a slot along their respective length direction, the slotted side of the first guide rail 103 is provided with the first rack 204, and the slotted side of the second guide rail 104 is provided with the second rack 207; first sliding chutes 101 are provided on both sides of the first guide rail 103 along the length direction, second sliding chutes 102 are provided on both sides of the second guide rail 104 along the length direction, both sides of the first sliding block 202 are provided with first limiting blocks 209 which are slidable along the first sliding chutes 101, and both sides of the second sliding block 205 are provided with second limiting blocks 210 which are slidable along the second sliding chutes 102, the motor assembly 201 is fixedly mounted on the first sliding block 202; the motor assembly 201 is rotatably connected to one end of the linkage shaft 208, the other end of the linkage shaft 208 away from the motor assembly 201 is rotatably mounted on the second sliding block 205, and both ends of the linkage shaft 208 are respectively provided with a first gear 203 and a second gear 206; and the first gear 203 is engaged with the first rack 204 in the slot of the first guide rail 103, and the second gear 206 is engaged with the second rack 207 in the slot of the second guide rail 104.

By using the motor assembly 201 to drive the linkage shaft 208, the first gear 203 and the second gear 206 on both sides of the linkage shaft 208 rotate synchronously, so that the first gear 203 and the second gear 206 move up and down synchronously on the first rack 204 and the second rack 207 correspondingly, and then the first sliding block 202 on the first guide rail 103 and the second sliding block 205 on the second guide rail 104 move up and down synchronously, where the motor assembly 201 also moves up and down with the first sliding block 202, therefore the the connecting mechanism moves up and down with the driving mechanism 200, which can ensure the synchronization of the lifting mechanism during lifting, thereby ensuring smooth lifting.

In some embodiments of the disclosure, the connecting mechanism is rotatably connected with the linkage shaft 208.

The linkage shaft 208 can drive the connecting mechanism in such a way that the external component can move up and down without rotating with the linkage shaft 208.

In some embodiments of the disclosure, the connecting mechanism is a bearing 301, an inner ring of the bearing 301 is in interference fit with the linkage shaft 208, and an outer ring of the bearing 301 is in interference fit with the external component.

The bearing 301 is rotatably connected with the linkage shaft 208 and the external component respectively, which can ensure that when the linkage shaft 208 rotates slowly, the external component can move up and down with the bearing 301 without rotating.

In some embodiments of the disclosure, at least two bearings 301 are mounted on the linkage shaft 208.

The reliability can be ensured when the bearings 301 are connected to external components.

In some embodiments of the disclosure, the connecting mechanism is fixedly connected to the first sliding block 202 and/or the second sliding block 205.

The connecting mechanism can move up and down with the corresponding sliding block.

A steak grill according to an embodiment of the disclosure is described below with reference to FIGS. 2 to 5.

Figure 2:
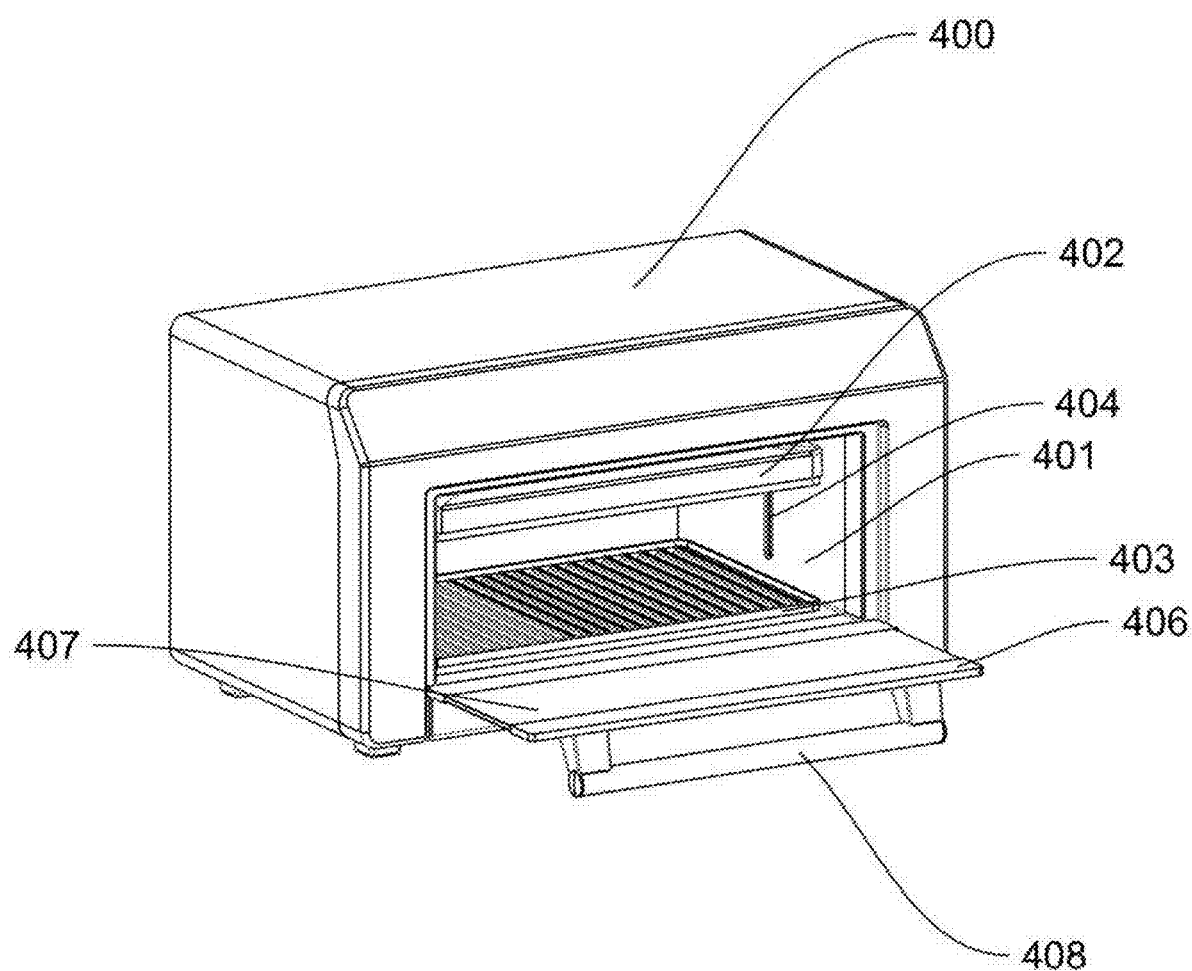
FIG. 2 is a schematic diagram of a steak grill according to an embodiment of the disclosure.
Figure 3:
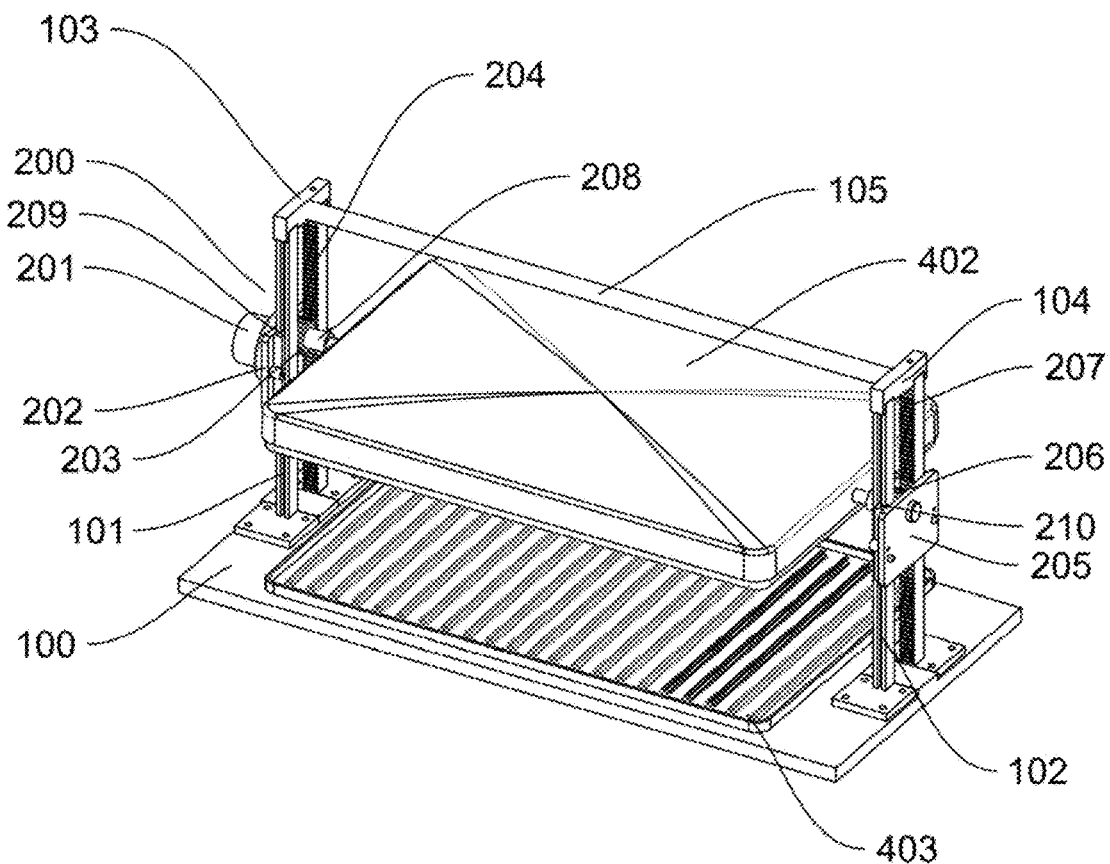
FIG. 3 is a schematic diagram of a steak grill according to an embodiment of the disclosure, which mainly shows the connection relationship between a lifting mechanism and an upper grill pan.

As shown in FIGS. 2 and 3, a steak grill according to an embodiment of the disclosure includes: a cabinet 400 in which a grill chamber 401 is formed, where an upper grill pan 402 and a lower grill pan 403 are provided in the grill chamber 401; and the lifting mechanism as described above, where the connecting mechanism is connected with the upper grill pan 402 or the lower grill pan 403, and rotation of the linkage shaft 208 enables relative movement between the upper grill pan 402 and the lower grill pan 403.

For example, in some embodiments of the disclosure, the chamber walls of the grill chamber 401 are provided with guide grooves 404 in the vertical direction, a mounting cavity is formed between a housing of the cabinet 400 and the chamber walls of the grill chamber 401, the motor assembly 201, the two racks and the two guide rails are all provided in the mounting cavity, and the linkage shaft 208 penetrates through the guide grooves 404 and is rotatably mounted on the upper grill pan 402.

Rotation of the linkage shaft 208 drives the upper grill pan 402 to move up and down, so that the distance between the upper grill pan 402 and the lower grill pan 403 can be adjusted according to steaks of different thicknesses for customized grilling, and meanwhile the smoothness of the upper grill pan 402 moving up and down can be ensured.

Figure 4:
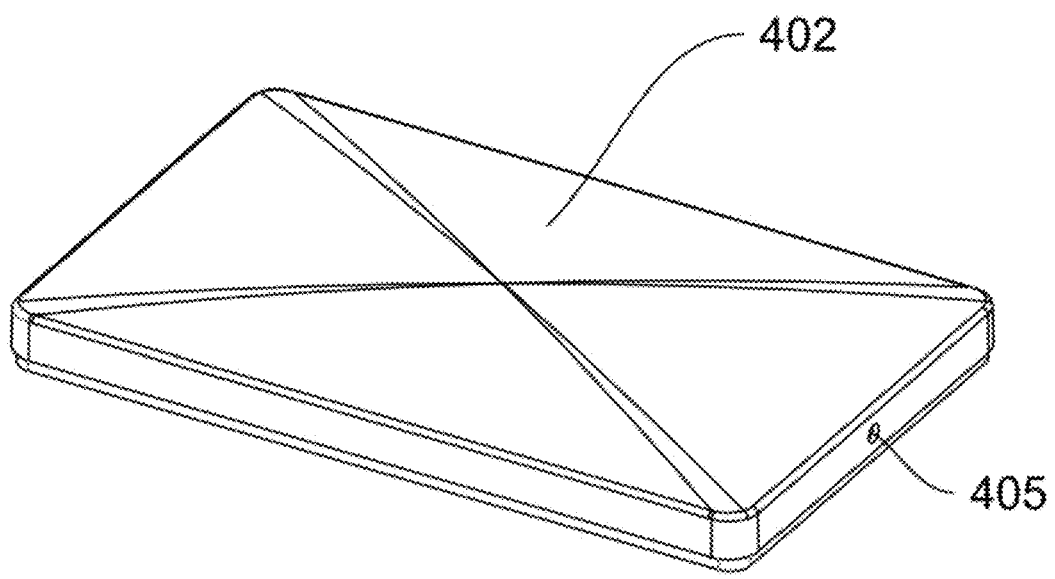
FIG. 4 is a schematic diagram of an upper grill pan of a steak grill according to an embodiment of the disclosure.
Figure 5:
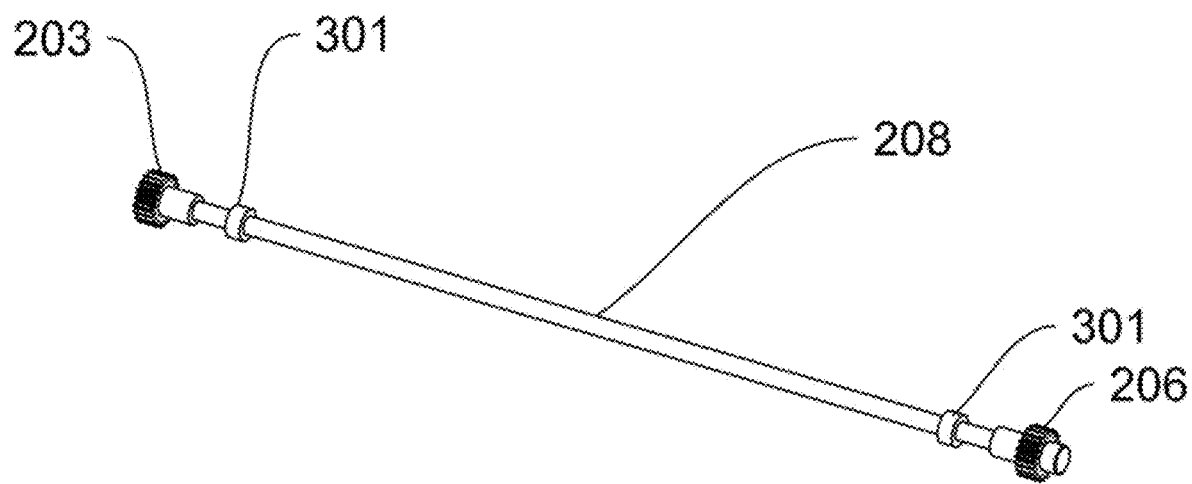
FIG. 5 is a schematic diagram of a linkage shaft of a steak grill according to an embodiment of the disclosure.

In some embodiments of the disclosure, as shown in FIGS. 4 and 5, the upper grill pan 402 is provided with through holes 405, the linkage shaft 208 is provided with two bearings 301, the linkage shaft 208 penetrates through the through holes 405, and the bearings 301 are mounted cooperatively with the through holes 405.

The upper grill pan 402 and the bearings 301 are rotatably mounted, when the linkage shaft 208 rotates at a low speed, the upper grill pan 402 will not rotate when moving up and down with the linkage shaft 208.

In some embodiments of the disclosure, a heating device is provided in the upper grill pan 402.

Food on the lower grill pan 403 is heated by the heating device in the upper grill pan 402.

In some embodiments of the disclosure, a cabinet door 406 is provided on the cabinet 400 in a hinged mode.

In some embodiments of the disclosure, thermal insulation glass 407 is provided on the cabinet door 406.

In some embodiments of the disclosure, a knob 408 is provided on the cabinet door 406.

In some embodiments of the disclosure, a reinforcing shaft 105 is provided on the lifting mechanism, both ends of the reinforcing shaft 105 are fixedly connected with the tops of the first guide rail 103 and the second guide rail 104 respectively and configured for reinforcing the guide rails on both sides.

The embodiments of the disclosure are described in detail above in conjunction with the accompanying drawings, but the disclosure is not limited to the above-mentioned embodiments. Within the scope of knowledge possessed by those of ordinary skill in the technical field, various changes can be made without departing from the purpose of the disclosure.

What is claimed is:

1. A lifting mechanism, comprising:
 a base, wherein a first vertical guide rail and a second vertical guide rail are provided on both sides of the base respectively;
 a driving mechanism, comprising an active driving mechanism, a passive driving mechanism and a linkage assembly, wherein the active driving mechanism comprises a motor assembly, a first sliding block, a first gear and a first rack, wherein the first sliding block is slidably mounted on the first guide rail, the motor assembly is fixedly mounted on the first sliding block, the first rack is provided on the first guide rail along a length direction of the first guide rail, and the first gear is engaged with the first rack; the passive driving mechanism comprises a second sliding block, a second gear and a second rack, wherein the second sliding block is slidably mounted on the second guide rail, the second rack is provided on the second guide rail along a length direction of the second guide rail, and the second gear is engaged with the second rack; and the linkage assembly comprises a linkage shaft, wherein the linkage shaft is connected with the first gear and the second gear, the linkage shaft is driven to rotate by the motor assembly, the first gear and the first sliding block are provided to rotate relative to each other, and the second gear and the second sliding block are provided to rotate relative to each other; and a connecting mechanism configured for being connected with an external component and capable of being driven by the driving mechanism to move up and down.

2. The lifting mechanism of claim 1, wherein the connecting mechanism is rotatably connected with the linkage shaft.

3. The lifting mechanism of claim 2, wherein the connecting mechanism is a bearing, wherein an inner ring of the bearing is in interference fit with the linkage shaft, and an outer ring of the bearing is in interference fit with the external component.

4. The lifting mechanism of claim 3, wherein at least two bearings are mounted on the linkage shaft.

5. The lifting mechanism of claim 1, wherein the connecting mechanism is fixedly connected with the first sliding block and/or the second sliding block.

6. A steak grill, comprising:

a cabinet, wherein a grill chamber is provided in the cabinet, and an upper grill pan and a lower grill pan are provided in the grill chamber; and a lifting mechanism, wherein the lifting mechanism comprises:

a base, wherein a first vertical guide rail and a second vertical guide rail are provided on both sides of the base respectively;

a driving mechanism, comprising an active driving mechanism, a passive driving mechanism and a linkage assembly, wherein the active driving mechanism comprises a motor assembly, a first sliding block, a first gear and a first rack, wherein the first sliding block is slidably mounted on the first guide rail, the motor assembly is fixedly mounted on the first sliding block, the first rack is provided on the first guide rail along a length direction of the first guide rail, and the first gear is engaged with the first rack; the passive driving mechanism comprises a second sliding block, a second gear and a second rack, wherein the second sliding block is slidably mounted on the second guide rail, the second rack is provided on the second guide rail along a length direction of the second guide rail, and the second gear is engaged with the second rack; and the linkage assembly comprises a linkage shaft, wherein the linkage shaft is connected with the first gear and the second gear, the linkage shaft is driven to rotate by the motor assembly, the first gear and the first sliding block are provided to rotate relative to each other, and the second gear and the second sliding block are provided to rotate relative to each other; and a connecting mechanism configured for being connected with an external component and capable of being driven by the driving mechanism to move up and down;

wherein the connecting mechanism is connected with the upper grill pan or the lower grill pan, and rotation of the motor assembly enables relative movement between the upper grill pan and the lower grill pan.

7. The steak grill of claim 6, wherein chamber walls of the grill chamber are provided with guide grooves in the vertical direction, a mounting cavity is formed between a housing of the cabinet and the chamber walls of the grill chamber, the active driving mechanism and the passive driving mechanism are both provided in the mounting cavity, and the linkage shaft penetrates through the guide grooves and is rotatably mounted on the upper grill pan.

8. The steak grill of claim 6, wherein the upper grill pan is provided with through holes, the linkage shaft is provided with two bearings, the linkage shaft penetrates through the through holes, and the bearings are mounted cooperatively with the through holes.

9. The steak grill of claim 6, wherein a heating device is provided in the upper grill pan.

10. The steak grill of claim 6, wherein a cabinet door is provided on the cabinet in a hinged mode.

* * * * *